United States Patent
Chen et al.

(10) Patent No.: US 12,543,883 B2
(45) Date of Patent: Feb. 10, 2026

(54) TEMPERATURE CONTROLLING STRUCTURE AND FILTER ASSEMBLY INCLUDING THE SAME

(71) Applicant: WISTRON CORP., New Taipei (TW)

(72) Inventors: Chih-Kang Chen, New Taipei (TW); Yu Tao Kao, New Taipei (TW); Chien Huang, New Taipei (TW); Yi-Nung Lin, New Taipei (TW)

(73) Assignee: WISTRON CORP., New Taipei (TW)

( * ) Notice: Subject to any disclaimer, the term of this patent is extended or adjusted under 35 U.S.C. 154(b) by 894 days.

(21) Appl. No.: 17/852,616

(22) Filed: Jun. 29, 2022

(65) Prior Publication Data

US 2023/0233013 A1   Jul. 27, 2023

(30) Foreign Application Priority Data

Jan. 21, 2022   (TW) .................................. 111102525

(51) Int. Cl.
  *A47J 31/06*   (2006.01)
  *A47J 31/02*   (2006.01)
  *A47J 31/56*   (2006.01)

(52) U.S. Cl.
  CPC ........... *A47J 31/0663* (2013.01); *A47J 31/56* (2013.01); *A47J 31/02* (2013.01)

(58) Field of Classification Search
  CPC .. A47J 31/02; A47J 31/06; A47J 31/00; A47J 31/4475; A47J 31/46; A47J 31/56; A47J 31/5253
  See application file for complete search history.

(56) References Cited

U.S. PATENT DOCUMENTS

| | | | |
|---|---|---|---|
| 2003/0110954 A1* | 6/2003 | Hoffman | A47J 37/1285 99/340 |
| 2012/0183659 A1* | 7/2012 | Hulett | A47J 31/46 426/431 |
| 2015/0359377 A1* | 12/2015 | Graham | A47J 31/3676 99/283 |
| 2021/0106162 A1* | 4/2021 | Ong | A47J 31/4457 |
| 2021/0235936 A1* | 8/2021 | Sjaastad | A47J 43/27 |
| 2021/0338000 A1* | 11/2021 | Almagor | A47J 31/06 |
| 2022/0378242 A1* | 12/2022 | Glupker | A47J 31/0626 |

FOREIGN PATENT DOCUMENTS

| | | | | |
|---|---|---|---|---|
| CN | 109133482 A | * | 1/2019 | ............ C02F 1/482 |
| CN | 209644684 U |   | 11/2019 | |
| KR | 101543151 B1 | * | 8/2015 | .......... A47J 31/4403 |
| KR | 102347497 B1 | * | 1/2022 | ............ A47J 31/02 |

OTHER PUBLICATIONS

EP Search Report dated Jun. 28, 2023 in European application No. 22195266.6-1016/4215089.
TW Office Action dated Sep. 27, 2022 in Taiwan application No. 111102525.

* cited by examiner

*Primary Examiner* — Steven W Crabb
*Assistant Examiner* — Allison E Helferty
(74) *Attorney, Agent, or Firm* — McClure, Qualey & Rodack, LLP

(57) ABSTRACT

A temperature controlling structure and a filter assembly including the same are provided, where the temperature controlling structure includes a bottom portion and a surrounding portion connected to the bottom portion, the bottom portion is configured for a filter cup detachably disposed thereon so that the filter cup is surrounded by an accommodation space defined by the surrounding portion and the bottom portion.

23 Claims, 18 Drawing Sheets

TEMPERATURE CONTROLLING STRUCTURE AND FILTER ASSEMBLY INCLUDING THE SAME

CROSS-REFERENCE TO RELATED APPLICATIONS

This non-provisional application claims priority under 35 U.S.C. § 119 (a) on Patent Application No(s). 111102525 filed in Taiwan (R.O.C.) on Jan. 21, 2022, the entire contents of which are hereby incorporated by reference.

TECHNICAL FIELD

The disclosure relates to a temperature controlling structure, more particularly to a temperature controlling structure and a filter assembly including the same.

BACKGROUND

With the improvement of living standards, coffee is not only a drink for helping people feel less tired and increase energy levels but more of a casual lifestyle that people are looking for. This makes coffee become more and more popular and also prompts the development of various tastes and new brewing styles. Pour-over coffee involves easily approachable tools so it is easy to get started for anyone.

Except for the selection and preparation of ground coffee, another key factor that affects the taste is the control of brewing temperature. Specifically, pour-over coffee at least involves the following steps: adding ground coffee into a filter cup with a filter paper, and pouring hot water over the ground coffee to extract chemical compounds; however, even if an electric kettle is used to keep the temperature of hot water stable, the hot water still will have a great temperature reduction when it interacts with the filter paper, the filter cup, and the ambient temperature. As a result, the actual brewing temperature will be way lower than the predetermined temperature and therefore leads to an under-extracted coffee. Moreover, because of all these temperature affecting factors, the actual temperature of the brewing water cannot be fixed and thus the brewing is uncontrollable, which causes a loss of quality in taste.

One of the conventional solutions is to raise the temperature of the brewing water so as to compensate for the impact of lower ambient temperature. Another conventional solution is to pre-heat the filter cup with heat packs or to pre-heat the filter cup by placing it on the top of a coffee machine with drying function, this solution is expected to pre-reduce the temperature difference between the filter cup and the hot water in order to reduce the influence that the ambient temperature has on the brewing water. However, the above conventional solutions both involve complicated calibration steps and require many years of experience, even an experienced barista is not necessarily able to solve the above issues with these solutions. Other than the above, it is also difficult to precisely control the brewing temperature during the middle to late brewing phases.

It is understood that other beverages that need brewing with water at a precise and stable temperature also would encounter the problems similar to the affection of ambient temperature or difficulty in controlling temperature of brewing water.

SUMMARY

Accordingly, one aspect of the disclosure is to provide a temperature controlling structure and a filter assembly including the same which are capable of purposely raising or reducing the temperature of the filter cup before or during the selected phase of brewing process in order to achieve a stable and controllable brew temperature.

One embodiment of the disclosure provides a filter assembly comprising a temperature controlling structure and a filter cup. The temperature controlling structure comprises a bottom portion and a surrounding portion. The surrounding portion is connected to the bottom portion. The filter cup is detachably disposed at the bottom portion. The surrounding portion, the bottom portion, and the filter cup define a liquid accommodation space surrounding the filter cup.

Another embodiment of the disclosure provides a temperature controlling structure, comprising a bottom portion, a surrounding portion, and a holding structure. The bottom portion is connected to the surrounding portion and the holding structure.

According to the temperature controlling structure and the filter assembly as discussed in the above embodiments of the disclosure, the temperature controlling structure provides a liquid accommodation space surrounding the filter cup, thus, before or during the brewing process, the user is allowed to pour water at a specific temperature into the temperature controlling structure to affect, control, or adjust the temperature of the filter cup and the filter paper therein. Taking pour-over coffee as an example, the temperature controlling structure allows the user to add water at a specific temperature into the liquid accommodation space during one or more selected phases (e.g., early phase, early-middle phase, middle phase, middle-late phase, and/or late phase) of brewing process, thus making it possible to minimize or adjust the temperature difference among the filter cup, filter paper, and the brewing water during the selected brewing phases. For example, by adding hot water into the liquid accommodation space during the early phase and early-middle phases, the temperatures of the filter cup and the filter paper can be raised so that the temperature difference among the filter cup, the filter paper, and the brewing water is reduced, which helps reduce the temperature reduction of the brewing water during the early to middle phases, thereby increasing the extraction rate of soluble solids during the selected phases. Alternatively, by adding water at lower temperature into the liquid accommodation space to decrease the temperature of the filter cup and the filter paper during the middle to late phases, the temperature difference among the filter cup, filter paper, and the brewing water can be increased, thereby decreasing the extraction rate of soluble solids during the selected phases.

As discussed, the temperature controlling structure and the filter assembly of the disclosure provide a convenient and efficient solution for user to adjust or control the temperature of brewing water during the selected brewing phase, allowing the user to significantly reduce or eliminate the negative influence that the ambient temperature has on the brewing water. Accordingly, the temperature controlling structure can assist the user in making the required taste of beverage as well as assist the user in ensuring consistency in the taste.

BRIEF DESCRIPTION OF THE DRAWINGS

The present disclosure will become better understood from the detailed description given hereinbelow and the accompanying drawings which are given by way of illustration only and thus are not intending to limit the present disclosure and wherein.

DETAILED DESCRIPTION

Aspects and advantages of the disclosure will become apparent from the following detailed descriptions with the accompanying drawings. The inclusion of such details provides a thorough understanding of the disclosure sufficient to enable one skilled in the art to practice the described embodiments but it is for the purpose of illustration only and should not be understood to limit the disclosure. On the contrary, it is intended to cover alternatives, modifications, and equivalents as can be included within the spirit and scope of the described embodiments as defined by the appended claims. To this end, those skilled in the relevant art will recognize and appreciate that many changes can be made to the various aspects of the disclosure described herein, while still obtaining the beneficial results of the present disclosure. It will also be apparent that some of the desired benefits of the present disclosure can be obtained by selecting some of the features of the present disclosure without utilizing other features.

It is to be understood that the phraseology and terminology used herein are for the purpose of better understanding the descriptions and should not be regarded as limiting. Unless specified or limited otherwise, the terms "mounted," "connected," "installed," "provided," and variations thereof are used broadly and encompass both direct and indirect mountings, connections, installations, and fixations. As used herein, the terms "substantially" or "approximately" may describe a slight deviation from a target value, in particular a deviation within the production accuracy and/or within the necessary accuracy, so that an effect as present with the target value is maintained. Unless specified or limited otherwise, the phrase "at least one" as used herein may mean that the quantity of the described element or component is one or more than one but does not necessarily mean that the quantity is only one. The term "and/or" may be used herein to indicate that either or both of two stated possibilities.

The disclosure provides temperature controlling structure and filter assembly having the same which are capable of reducing or eliminating the unwanted influence that the ambient temperature has on the brewing water. The temperature controlling structures and filter assemblies as discussed in the following embodiments are not only applicable to brewing coffee but also applicable to other beverages (e.g., tea) that also involve brewing techniques and have the need to prevent brewing water from being affected by environmental factors.

Figure 1:
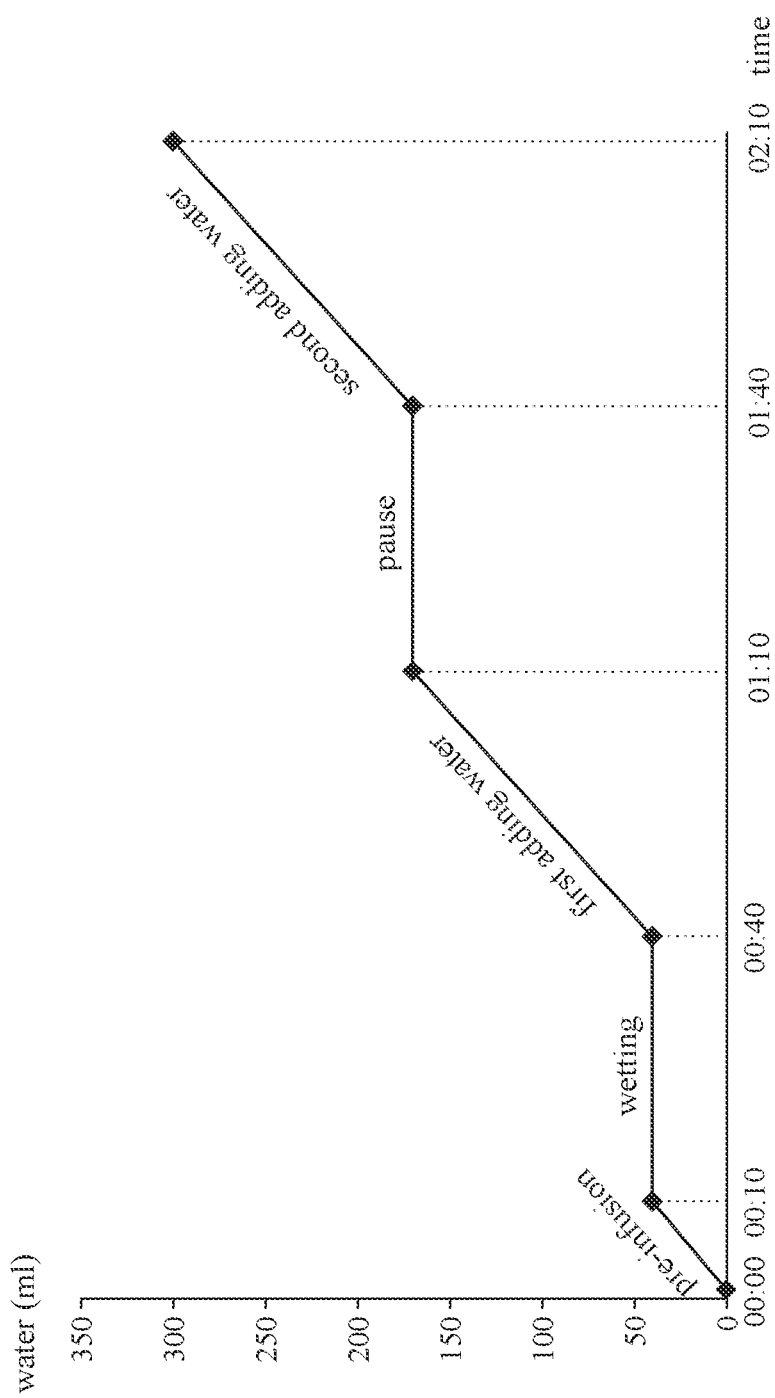
FIG. 1 shows a general brewing process for pour-over coffee.
Figure 2:
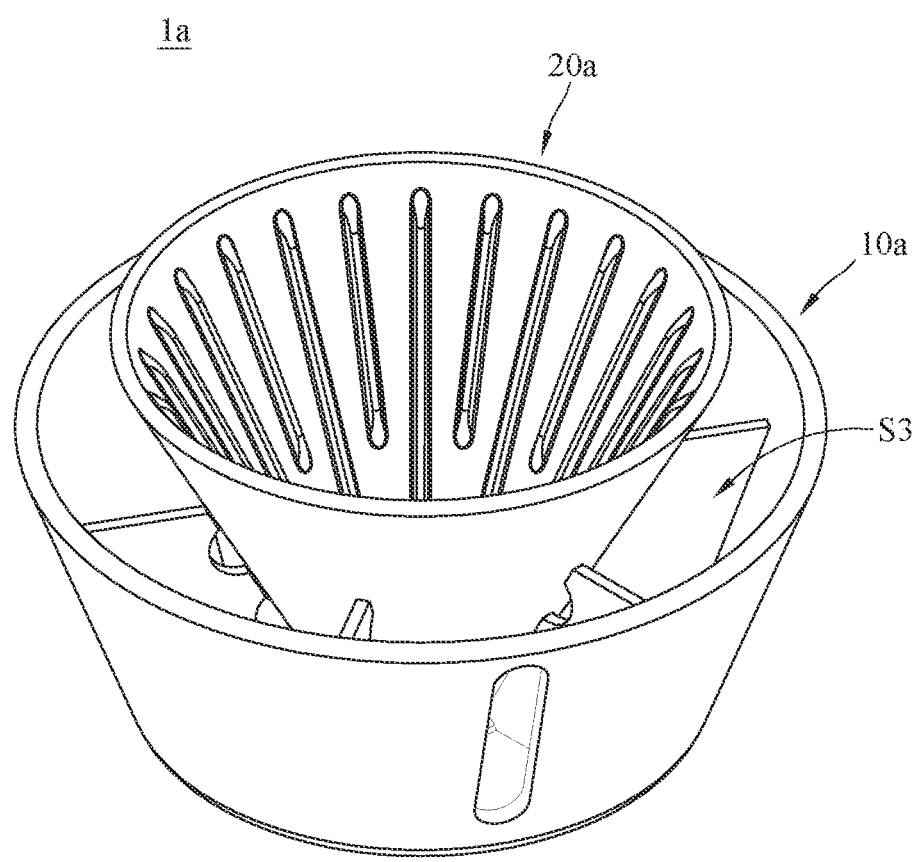
FIG. 2 is a perspective view of a filter assembly according to one embodiment of the disclosure.
Figure 3:
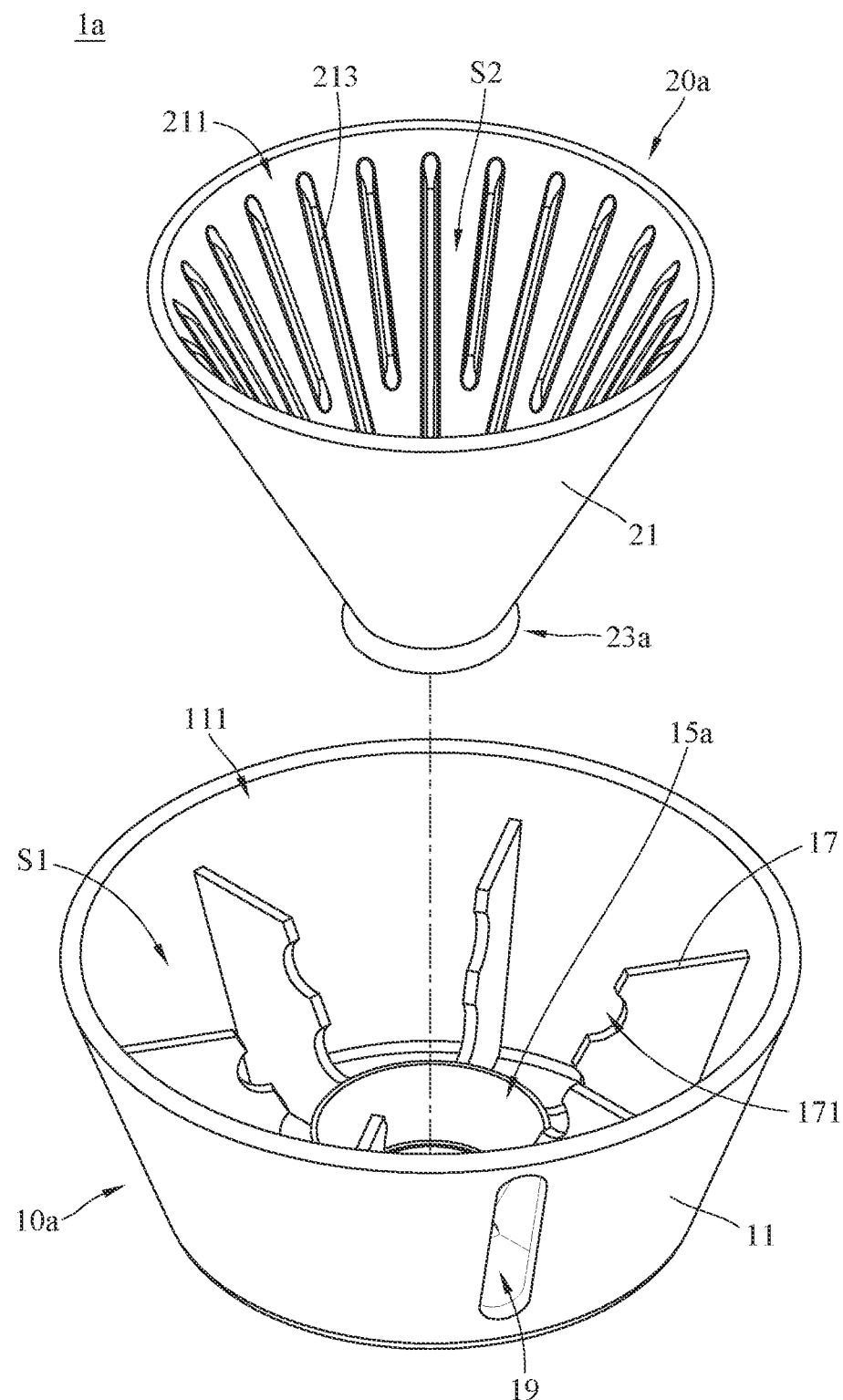
FIG. 3 is an exploded view of the filter assembly in FIG. 2.
Figure 4:
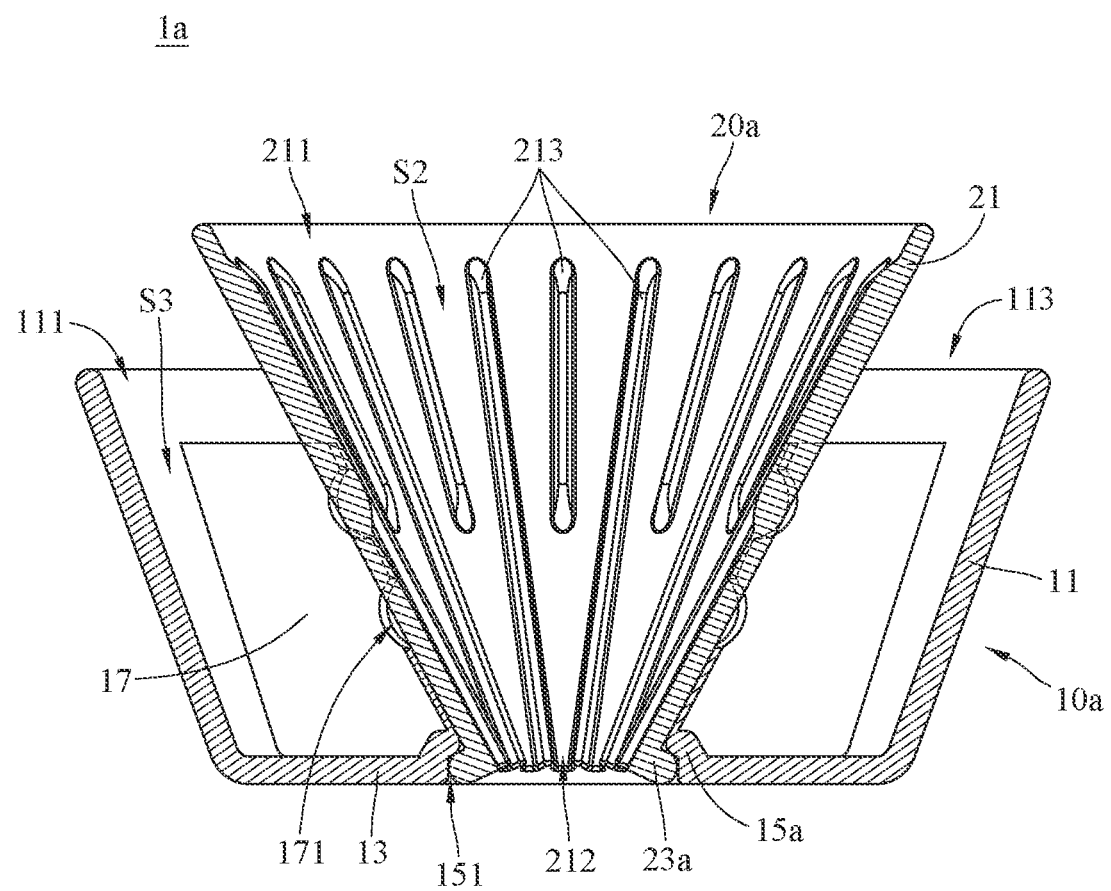
FIG. 4 is a cross-sectional view of the filter assembly in FIG. 2.

Firstly, please refer to FIG. 1, FIG. 1 provides a general brewing process for pour-over coffee. Before the brewing process, ground coffee can be spooned into a filter paper in a filter cup. FIG. 1 records a 2-minute brewing process of approximately 300 milliliters of hot water at approximately 92-94° C. for ground coffee of approximately 20 grams. As shown, the process may involve a few phases: a pre-infusion phase—adding a small amount of hot water (approximately 40 milliliters) to the ground coffee for about 10 seconds; a wetting phase—wetting the ground coffee for about 30 seconds; a first adding water phase—adding a larger amount of hot water (approximately 130 milliliters) to the ground coffee for about 30 seconds; a pause phase-extending the time that the fresh hot water extracts the water—soluble materials out of the ground coffee for about 30 seconds; and a second adding water phase-adding a larger amount of hot water (approximately 130 milliliters) again to the ground coffee for about 30 seconds.

It is known that, except for the type of coffee beans, the grind size and the times and way of pouring hot water, the temperature of the hot water for brewing is also one of the main factors that affects the taste and extraction rate. During the brewing process, various flavors appear at different points in time and continue to develop. In general, the higher the temperature of water for brewing ground coffee, the higher the extraction rate of the chemical compounds of the ground coffee. On the other hand, if the temperature of the water for brewing ground coffee is not high enough, the extraction rate of the chemical compounds of the ground coffee will decrease. It is also known that salty and sour tastes can be produced mainly during the early phase, sweet taste occurs mainly since the middle phase, and bitterness and thick taste occur mainly during the late phase. Thus, different tastes and flavors can be manually enhanced by adjusting the extraction rate at different time points of the brewing process. Specifically, the pre-infusion phase and the wetting phase are basically to wet the ground coffee before extraction, and the extraction of the chemical compounds mainly begin at the first adding water phase; thus, the first adding water phase can be considered as an early to middle phase of brewing that mainly produces salty, sour, or sweet taste. If the coffee is under-extracted during the early to middle phases, the final product will be less salty, sour, or sweet. On the other hand, the second adding water phase can be considered as a middle to late phase of brewing that mainly produces bitter taste, thus, the extraction rate during the middle to late phases will affect the bitterness of the final product.

However, before brewing, there is a significant temperature difference between the filter paper, the filter cup, and the ambient temperature and the hot water, thus the filter paper, the filter cup, and the ambient temperature will noticeably decrease the temperature of the first pouring hot water into the filter cup, resulting in the actual brewing water at a temperature way lower than what is expected to brew the ground coffee. As a result, the middle phase is easily become under-extracted and thus failing to obtain coffee with expected taste, flavor, and/or aroma.

To this end, please refer to FIGS. 1-4, one embodiment of the disclosure provides a filter assembly 1a. The filter assembly 1a may include a temperature controlling structure 10a and a filter cup 20a. The filter cup 20a is detachably installed on the temperature controlling structure 10a. The filter cup 20a is configured to accommodate beverage ingredients to be brewed (e.g., ground coffee or tea leaves). The filter cup 20a is also configured to filter the residue during brewing. The temperature controlling structure 10a surrounds the filter cup 20a when it is installed onto the filter cup 20a. Also, the temperature controlling structure 10a is configured to accommodate water of the required temperature and volume so as to affect, control, or adjust the temperatures of the filter cup 20a and filter paper therein, so that the temperatures of the filter cup 20a and filter paper can be as close to the target temperature set by the user as possible in each stage of the coffee brewing process, thereby facilitating to ensure the extraction rate and stability of the pour-over coffee in each stage.

Considering the operation convenience or reliability, the temperature controlling structure 10a may be a single piece integrally formed of a material with suitable wear resistance, fatigue life, elasticity, thermal insulation, and range of working temperature (e.g., ranging from about-10 to 120° C.). In one example, the temperature controlling structure 10a may be made of silicon or rubber. The filter cup 20a may be a single piece integrally formed of a material typically used for a coffee filter cup. Optionally, any typical disposable filter paper (not shown) can be placed in the filter cup 20a to trap the coffee grounds in it and let the liquid substance flow freely through the filter cup 20a. In other embodiments, the filter paper may be replaced by a filter net embedded at the bottom side of the filter cup.

In more detail, in this embodiment, the temperature controlling structure 10a may include a surrounding portion 11, a bottom portion 13, and a holding structure 15a. The bottom portion 13 is connected to and located between the surrounding portion 11 and the holding structure 15a, which means that the bottom portion 13 may be integrally formed with one or both of the surrounding portion 11 and the holding structure 15a, or, the bottom portion 13 may be a component separated from one or both of the surrounding portion 11 and the holding structure 15a (that is, the temperature controlling structure 10a may be constructed by or made of more than two separated pieces). The bottom portion 13 is the part of the temperature controlling structure 10a used to be placed on the top of a cup or a container which is suitable for receiving the brewed liquid. Note that the shape and size of the bottom portion 13 may be modified as required. The surrounding portion 11 extends outwards from the bottom portion 13 in a specific direction to become the part of the temperature controlling structure 10a used to surround the filter cup 20a. The surrounding portion 11 and the bottom portion 13 together define an accommodation space S1. The accommodation space S1 is configured to accommodate and surround the filter cup 20a. Also, an edge of the surrounding portion 11 located away from the bottom portion 13 defines an enlarged opening 111 exposing the accommodation space S1. The enlarged opening 111 is served as an opening or entrance for the placement of the filter cup 20a into the temperature controlling structure 10a and for the pouring of water into the accommodation space S1. Note that the shape and size of the accommodation space S1 and the enlarged opening 111 may be modified as required, such as the required amount of water, shape or size of the filter cup, or the operation convenience.

The holding structure 15a is arranged at the bottom portion 13. The holding structure 15a is the part of the temperature controlling structure 10a used for the installation of the filter cup 20a. Also, to allows the liquid in the filter cup 20a to flow out of the filter cup 20a, the holding structure 15a may have a coupling hole 151. Specifically, the coupling hole 151 is a through hole located at a side of the accommodation space S1 opposite to the enlarged opening 111; in other words, the enlarged opening 111 and the coupling hole 151 are two through holes respectively located at two opposite sides of the accommodation space S1. As such, the coupling hole 151 exposes a liquid outlet 212 of the filter cup 20a when the filter cup 20a is installed on the holding structure 15a; in other words, the coupling hole 151 allows the liquid outlet 212 of the filter cup 20a to be in fluid communication with the outside.

In this embodiment, the filter cup 20a may include a cup portion 21. The cup portion 21 defines or surrounds an accommodation space S2 configured for accommodating a filter paper and beverage ingredients to be brewed (not shown). The cup portion 21 also defines or surrounds a liquid inlet 211 and a liquid outlet 212 respectively at two opposite sides of the accommodation space S2. The liquid inlet 211 and the liquid outlet 212 are in fluid communication with the accommodation space S2. The liquid inlet 211 is served as an opening or entrance allowing beverage ingredients and hot water to go flow the accommodation space S2. The liquid outlet 212 is located at or in fluid communication with the coupling hole 151 of the temperature controlling structure 10a, such that the brewed liquid can flow out through the liquid outlet 212. Note that the shapes and sizes of the filter cup 20a and the cup portion 21, the accommodation space S2, the liquid inlet 211, and the liquid outlet 212 of the filter cup 20a all may be modified as required. In other embodiments, the cup portion of the filter cup may have the shape similar to any typical filter cup. In this embodiment, an internal wall of the temperature controlling structure 10a and at least part of an external wall of the filter cup 20a may together define a liquid accommodation space S3 therebetween, and an edge of the surrounding portion 11 of the temperature controlling structure 10a and an edge of the cup portion 21 of the filter cup 20a may together define a liquid inlet 113 therebetween. The liquid inlet 113 may be served as an opening or entrance for liquid to go into the liquid accommodation space S3. The liquid within the liquid accommodation space S3 can be used to affect, adjust, or control the temperature of the filter cup 20a. Thus, the liquid in the liquid accommodation space S3 may also be called "temperature-controlling water" hereinafter. Note that the shapes and sizes of the liquid accommodation space S3 and the liquid inlet 113 may be modified as required, for example, according to the required amount of water or the shape or size of the filter cup.

The cup portion 21 of the filter cup 20a is detachably disposed on the bottom portion 13 of the temperature controlling structure 10a. Specifically, the filter cup 20a may further include an installation portion 23a provided on the cup portion 21 and arranged at a side of the cup portion 21 located away from the liquid inlet 211, and the installation portion 23a is the part of the filter cup 20a used to be detachably installed to the holding structure 15a of the temperature controlling structure 10a. As shown, the installation portion 23a may, but is not limited to, be a flange extending outwards from the cup portion 21. The installation portion 23a is configured to be detachably engaged with the holding structure 15a of the temperature controlling structure 10a. To achieve watertightness, an external wall of the installation portion 23a of the filter cup 20a and an internal wall of the holding structure 15a of the temperature controlling structure 10a may have mating contours; in other words, the installation portion 23a of the filter cup 20a and the holding structure 15a of the temperature controlling structure 10a may have an interference fit in size and shape.

Optionally, the temperature controlling structure 10a may further include at least one support rib 17 radially extending inward from an internal wall of the surrounding portion 11; in other words, the one or more support ribs 17 extend towards the central area of the accommodation space S1 from the surrounding portion 11. When the filter cup 20a is assembled to the temperature controlling structure 10a, the support ribs 17 support and contact the external wall of the cup portion 21 of the filter cup 20a, helping reinforce the overall structure of the assembly of the filter cup 20a and the temperature controlling structure 10a, and stabilize the position of the filter cup 20a relative to the temperature controlling structure 10a. As such, the temperature controlling structure 10a is prevented from being unwantedly deformed when being held by a user. Note that the design and number of the support ribs 17 may be modified as required. In the case that the temperature controlling structure is relatively rigid in shape and material, the surrounding portion may not have any support rib thereon. In another embodiment of the disclosure, the support ribs 17 may extend towards the central area of the accommodation space S1 from the bottom portion 13.

Optionally, the support ribs 17 may each have at least one hole 171, the hole 171 permits the fluid communication between the areas at opposite sides of the support ribs 17. Thus, when the support ribs 17 support the filter cup 20a, the temperature-controlling water in the accommodation space S1 is still allowed to be rapidly distributed around the filter cup 20a. Note that the design, location, and number of the holes 171 may be modified as required. In some embodiments, the hole 171 may be a cut-off or a recess formed on an edge of the support rib 17, and a fluid communication passage may be formed by the hole 171 and the cup portion 21 of the filter cup 20a when the filter cup 20a is assembled to the surrounding portion 11. In some other embodiments, the support ribs 17 may omit the holes 171.

The surrounding portion 11 of the temperature controlling structure 10a may include at least one light-permeable portion 19. The light-permeable portion 19 allows the user to observe the liquid level of the water within the accommodation space S3 from the outside of the surrounding portion 11. It is noted that the light-permeable portion of the temperature controlling structure is optional; in other embodiments, the surrounding portion of the temperature controlling structure may not have any light-permeable portion; in some other embodiments, the whole of the surrounding portion of the temperature controlling structure may be made of light-permeable material.

In addition, at least one rib 213 protrudes from an internal wall of the cup portion 21. The ribs 213 prevent the filter paper from fully attaching to the internal wall of the cup portion 21 and preserve air channels with respect to the filter paper to ensure that the liquid may smoothly flow through the liquid outlet 212 of the filter cup 20a. It is noted that the ribs on the cup portion are optional. In some other embodiments, the internal wall of the cup portion of the filter cup may not have any rib as the filter cup is cooperated with a filter paper with a wave shape which prevents itself from fully attaching to the internal wall of the cup portion.

As the filter assembly 1a discussed above, the arrangement that the surrounding portion 11 of the temperature controlling structure 10a surrounds the filter cup 20a allows the user to add water at a specific temperature into the liquid accommodation space S3 within the temperature controlling structure 10a from the liquid inlet 113 before or during the brewing process, such that the user is able to effectively and efficiently affect, control, or adjust the temperature of the filter cup 20a and the temperature of the filter paper therein. Understandably, the inclination of the surrounding portion 11 of the temperature controlling structure 10a and the distance between the surrounding portion 11 and the cup portion 21 of the filter cup 20a both may be modified as required as long as water can be poured into the liquid accommodation space S3.

Figure 5:
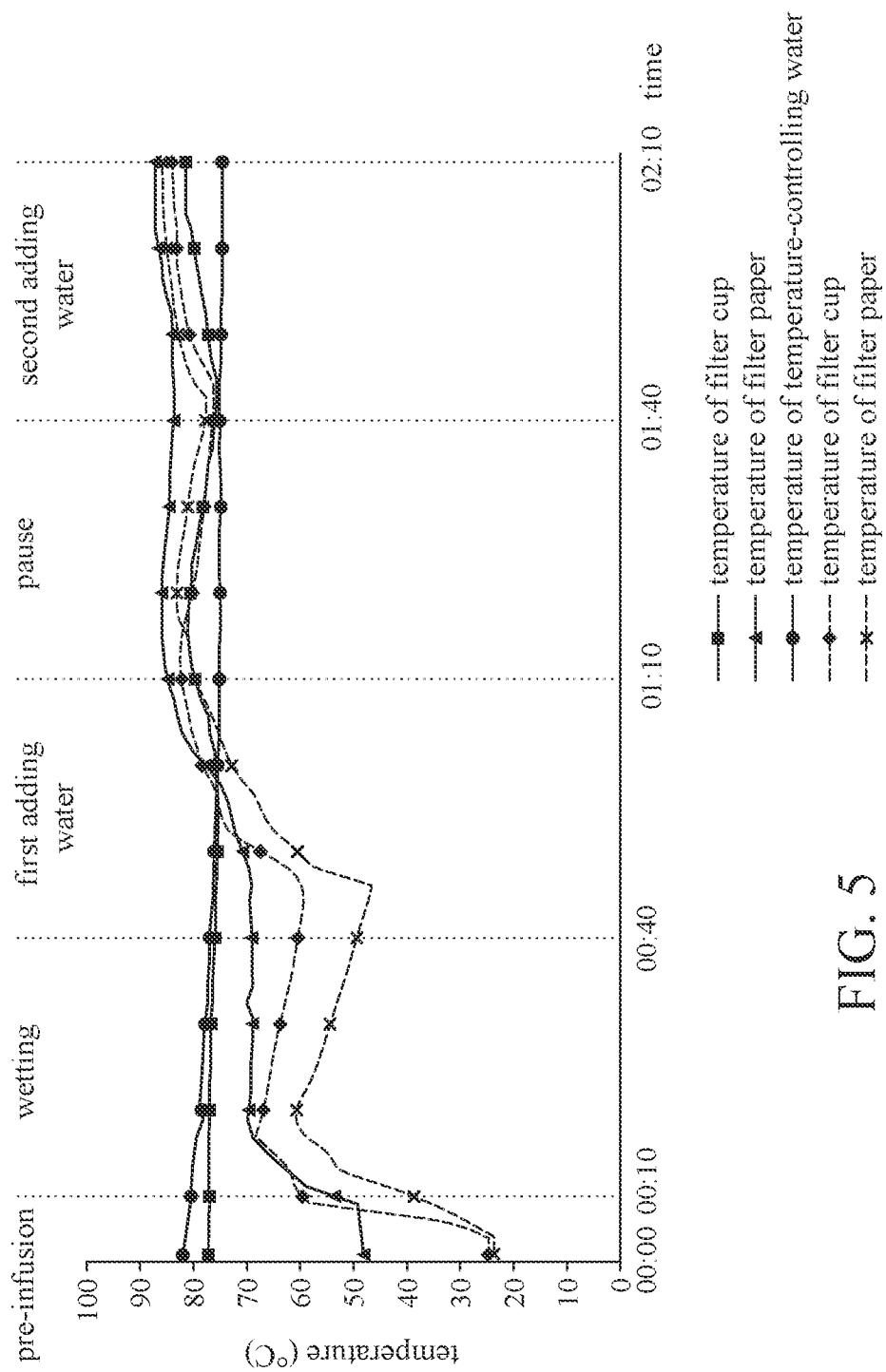
FIG. 5 is a graph showing the temperature variation curves of the filter cup and the filter paper with the temperature controlling structure in FIG. 2 during the brewing process and the temperature variation curves of the filter cup and the filter paper without the temperature controlling structure in FIG. 2 during the same process.

Then, please refer FIG. 1 and further refer to FIG. 5, a graph is provided to show a temperature variation curves of the filter cup 20a and a filter paper with the temperature controlling structure 10a during the brewing process in FIG. 1 and a temperature variation curves of a filter cup and a filter paper without the temperature controlling structure 10a during the same process.

In FIG. 5, the temperature variation curves are measured by pouring about 300 milliliters of hot water at about 92° C. into two sets of ground coffee of about 20 grams in the same grind size under an ambient temperature of about 23.5° C., where the solid lines indicate the temperature variations of the filter cup 20a in the filter assembly 1a and the filter paper during the brewing process in FIG. 1, and the broken lines indicate the temperature variations of the same filter cup 20a and filter paper without the temperature controlling structure 10a during the same brewing process.

Please see the broken lines, when the hot water is firstly added into the filter cup 20a during the pre-infusion phase, the temperatures of both the filter cup 20a and the filter paper are raised from the ambient temperature. Normally, the adding of hot water during the pre-infusion phase is to preliminarily wet the ground coffee, thus the pre-infusion phase only needs a small amount of hot water. Then, there is no hot water pouring into the filter cup 20a during the wetting phase, thus the temperatures of the filter cup 20a and the filter paper will have a significant reduction due to the influence of the ambient temperature. As a result, before the first adding water phase, the temperatures of the filter cup 20a and the filter paper respectively go down to about 60° C. and 50° C. so as to have a significant temperature difference with the brewing hot water. Consequently, a large part of the thermal energy of the hot water added during the first adding water phase is absorbed by the filter cup 20a and the filter paper, thus the actual temperature of the water will be too low to brew the ground coffee as expected, resulting in an under extracted coffee at the specific brewing phase.

In contrast, the solid lines show that when the hot water (i.e., the temperature-controlling water) at a specific temperature was added into the temperature controlling structure 10a to heat or pre-heat the filter cup 20a and the filter paper, although the temperature-controlling water in the temperature controlling structure 10a is decreased to about 82° C. due to the influences of the filter cup 20a, the filter paper, and the ambient temperature during the pre-infusion phase, the temperature-controlling water still can make the filter cup 20a begin to brew at a relative high temperature (about 75-80° C.) because its thermal energy is absorbed by the filter cup 20a. Similarly, the temperature-controlling water in the temperature controlling structure 10a also can make the filter paper begin to brew at a relative high temperature (about 50° C.) since the filter paper absorbs the thermal energy of the temperature-controlling water in the temperature controlling structure 10a.

Also, due to the thermal energy provided by the temperature-controlling water in the temperature controlling structure 10a, there is no significant reduction in temperature of the filter cup 20a and the filter paper resulted from the ambient temperature during the wetting phase.

As such, before the first adding water phase, the filter cup 20a and the filter paper can be respectively raised up to about 75-80° C. and 70° C. so as to have a small temperature difference with the brewing water. This can largely reduce the impact that the filter cup 20a and filter paper have on the hot water poured during the first adding water phase. As a result, the temperature-controlling water is able to prevent the filter cup 20a and filter paper from affecting the actual temperature of water used to brew coffee and thereby ensuring an extraction rate at the specific phase.

It is noted that, during the beginning of the first adding water phase, the temperature increase of the filter paper shown in solid line may be delayed since the brewing hot water needs time to flow over the wet ground coffee. In addition, since the filter paper is in direct contact with the hot water for brewing coffee, its temperature may be higher than that of the filter cup during the first adding water phase, as shown, and may go up gradually to about 92° C. in the later phases.

As can be seen from the comparison of the filter cup with the temperature controlling structure 10a and the filter cup without the temperature controlling structure 10a, the filter assembly 1a enables a smaller temperature difference between the filter cup 20a and filter paper, and the hot water for brewing; in other words, the filter assembly 1a is able to significantly reduce the temperature reduction of hot water used for brewing coffee, thereby achieving the wanted extraction rate during the selected phase. In short, the filter assembly 1a allows the user to effectively reduce the impact of the ambient temperature on the brewing water so as to achieve a relatively stable brewing water temperature for specific phase.

Optionally, the filter assembly 1a also allows cold water added to the temperature controlling structure 10a to cool the filter cup 20a and the filter paper during the pause phase before the second adding water phase, such that temperature of the water poured during the second adding water phase can be cooled down, thereby on purposely making the ground coffee under-extracted during the second adding water phase. By doing so, the bitter taste that is mainly produced during the middle to late phase can be significantly reduced. As discussed, the filter assembly 1a provides a convenient and efficient solution for the user to control or adjust the temperature of the brewing water during the selected phase of the brewing process, which makes the user able to significantly reduce or eliminate the negative influence that the ambient factors have on the brewing water and also can assist the user in making the required taste of pour-over coffee.

It is noted that the previous filter assembly is one of exemplary embodiments that can achieve the effect as shown in FIG. 5 but is not intended to limit the disclosure. It is also noted that the filter assembly can be modified according to actual requirements. The following provides filter assemblies of other embodiments which are all capable of achieving the effect the same as shown in FIG. 5, but for the purpose of simplicity, only the main differences between the introduced embodiment and the previous embodiments will be described in detail, and the same or similar parts can be comprehended with reference to the corresponding paragraphs and thus will not be repeatedly described hereinafter. It is also noted that the same reference number denote the same component or element.

Figure 6:
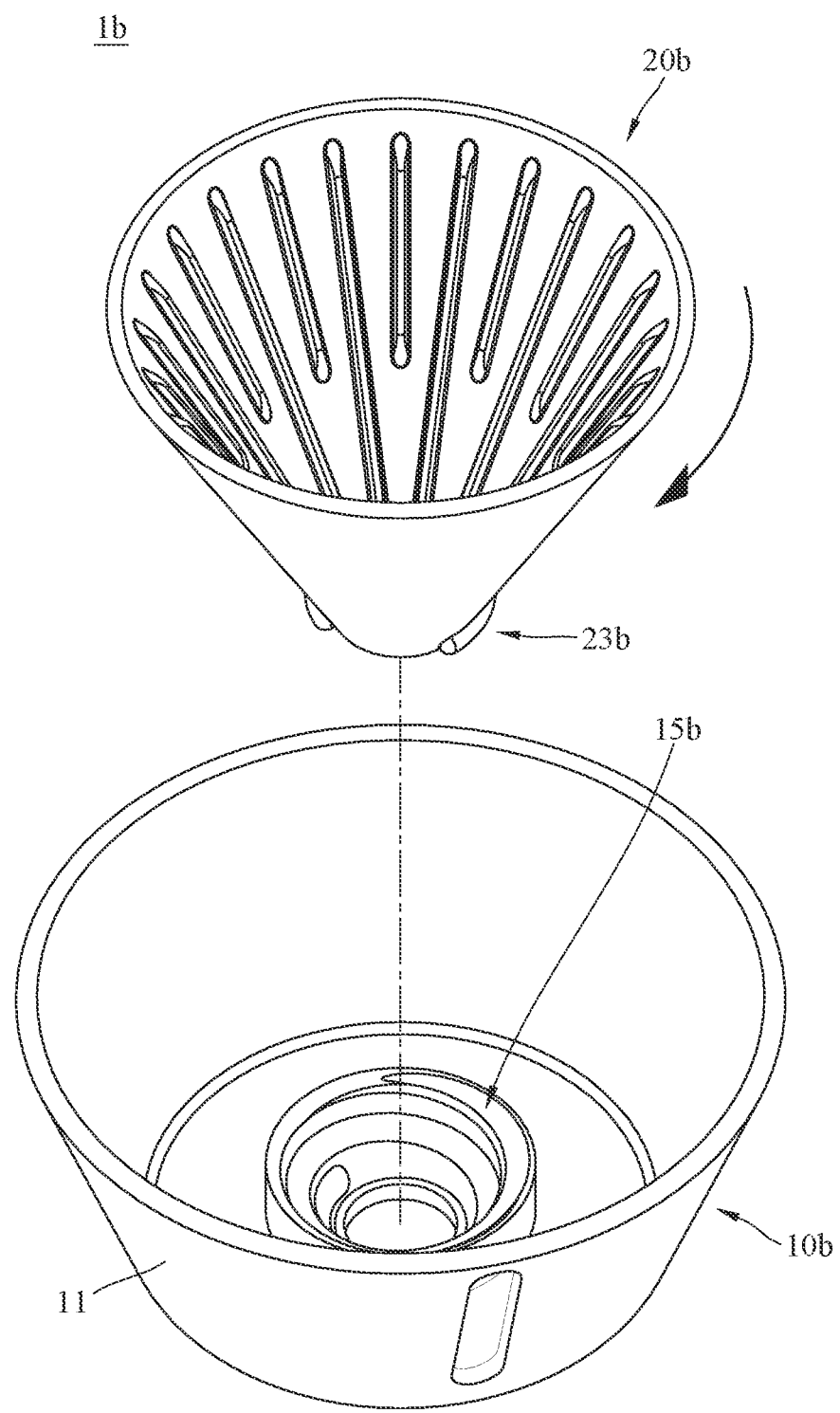
FIG. 6 is an exploded view of a filter assembly according to another embodiment of the disclosure.
Figure 7:
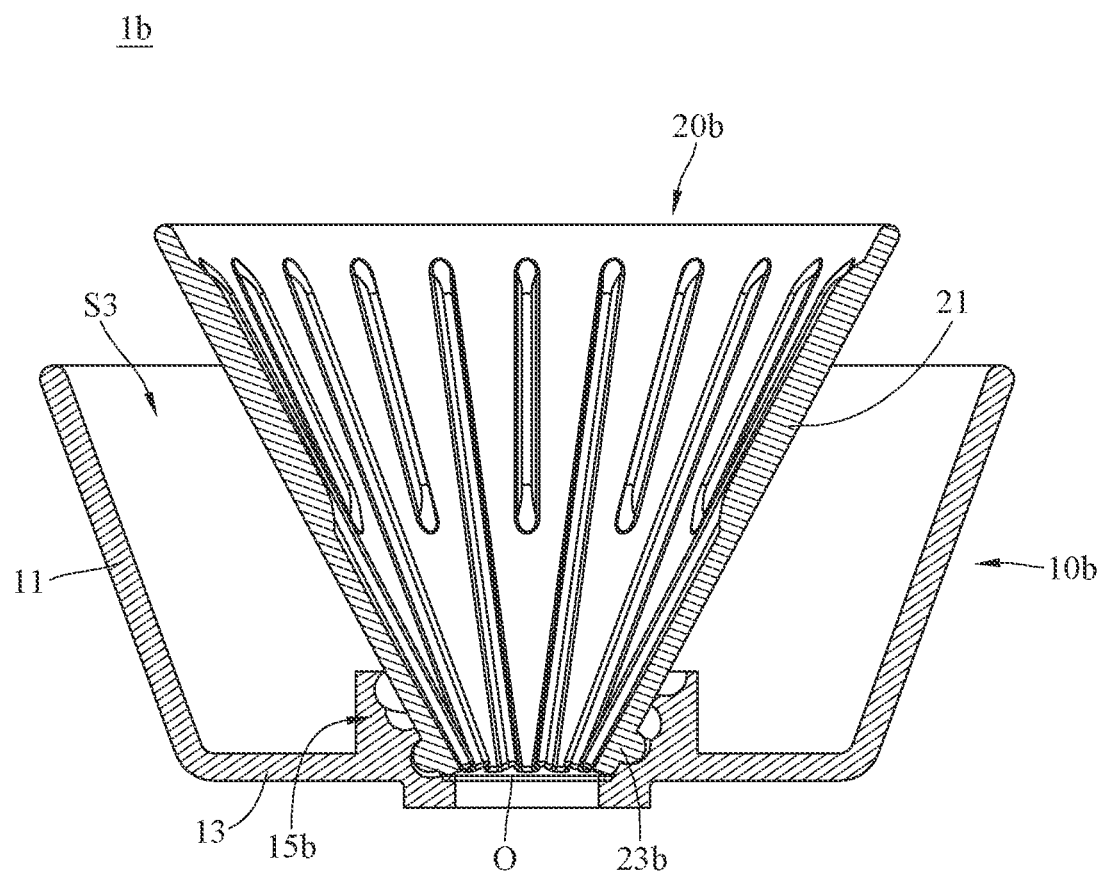
FIG. 7 is a cross-sectional view of the filter assembly in FIG. 6.
Figure 8:
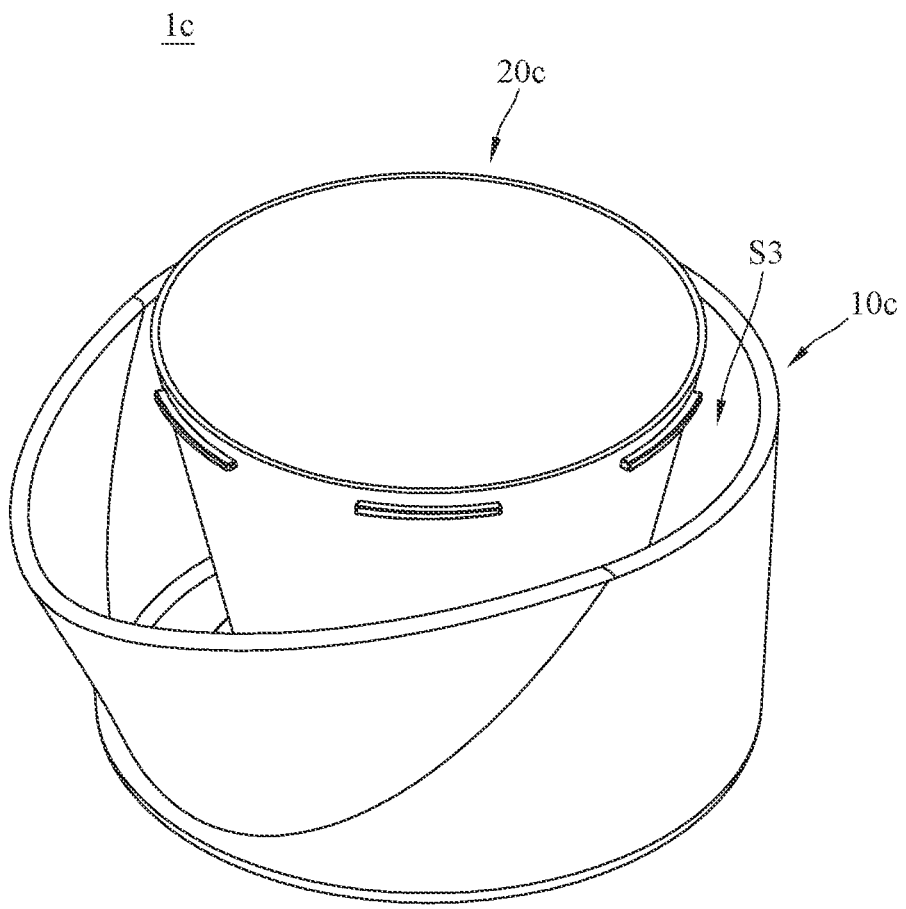
FIG. 8 is a perspective view of a filter assembly according to another embodiment of the disclosure.
Figure 9:
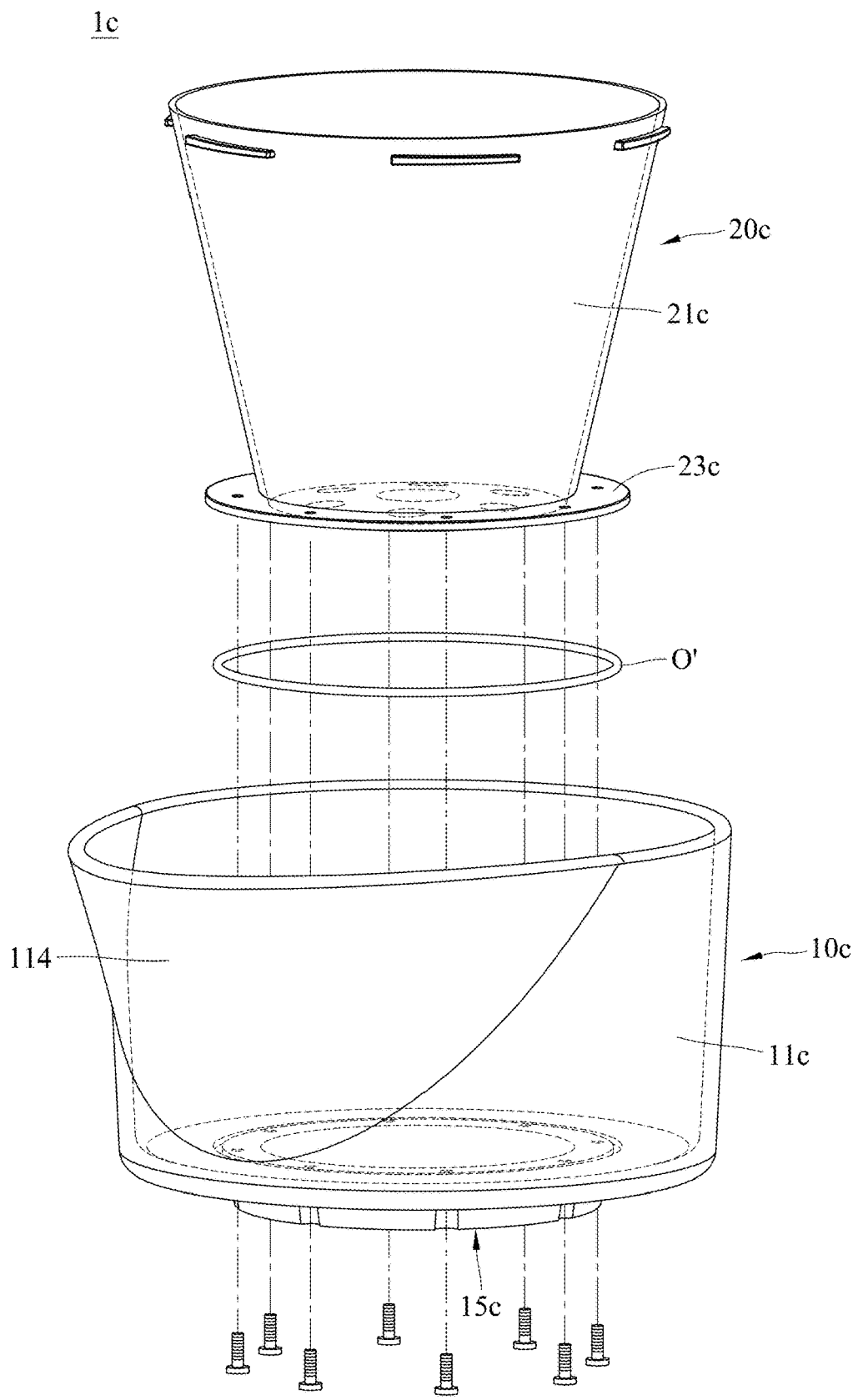
FIG. 9 is an exploded view of the filter assembly in FIG. 8.
Figure 10:
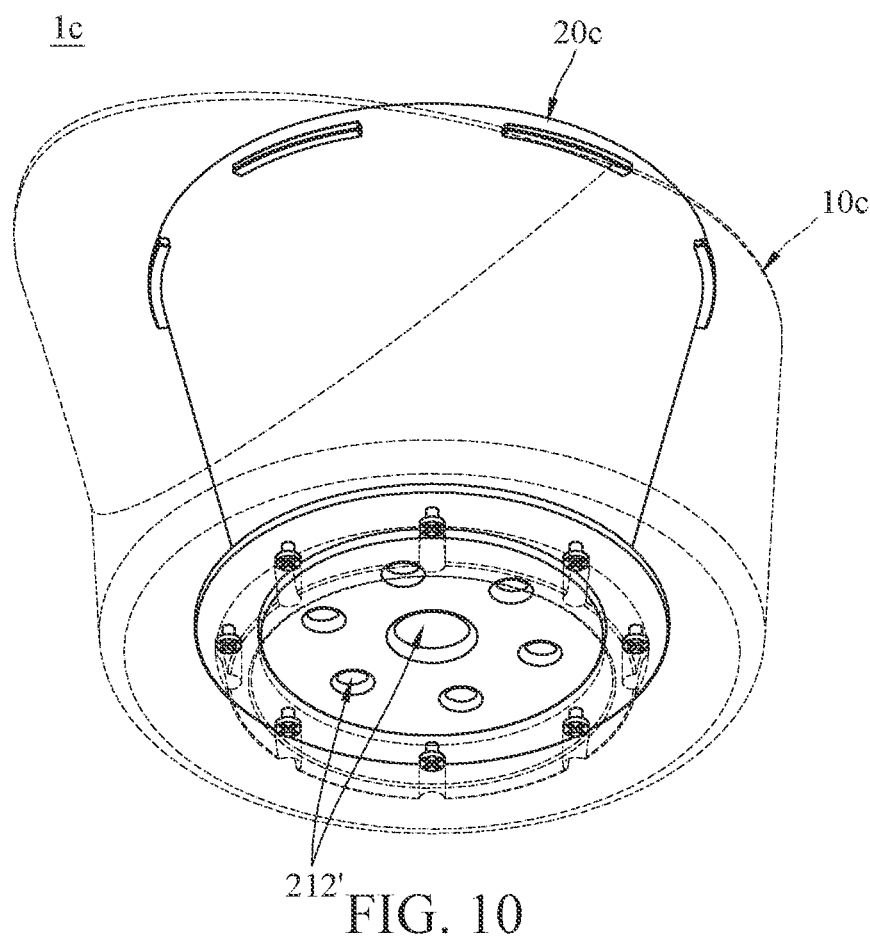
FIG. 10 is another perspective view of the filter assembly in FIG. 8.
Figure 11:
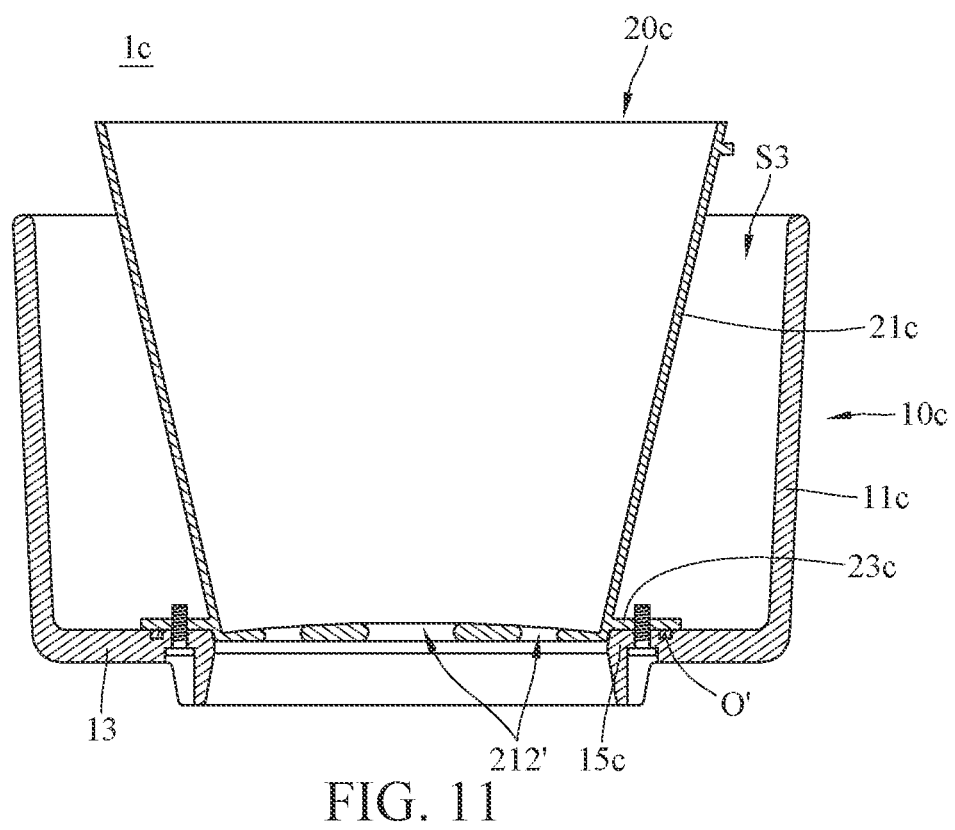
FIG. 11 is a cross-sectional view of the filter assembly in FIG. 8.

Please refer to FIGS. 6-7, another embodiment of the disclosure provides a filter assembly 1b, a temperature controlling structure 10b of the filter assembly 1b includes a holding structure 15b being an internal thread, a filter cup 20b includes an installation portion 23b being an external thread protruding outwards from the external wall of the cup portion 21 and suitable for engaging with the internal thread (i.e., the holding structure 15b). In such an arrangement, the filter cup 20b can be fixed to the temperature controlling structure 10b by being screwed into the temperature controlling structure 10b.

In addition, in this embodiment, the filter assembly 1b may further include a waterproof ring O, the waterproof ring O may be made of rubber and can be arranged between the holding structure 15b and the installation portion 23b to achieve the watertightness of the joint between the temperature controlling structure 10b and the filter cup 20b.

Please refer to FIGS. 8-11, another embodiment of the disclosure provides a filter assembly 1c, a surrounding portion 11c of a temperature controlling structure 10c of the filter assembly 1c may include an outwardly extending portion 114, the area between the outwardly extending portion 114 and a filter cup 20c is wider to facilitate the pour of water into the temperature controlling structure 10c.

In addition, a holding structure 15c of the temperature controlling structure 10c may include one or more threaded holes or through holes, an installation portion 23c of the filter cup 20c may include one or more threaded holes or through holes. In such an arrangement, the holding structure 15c and the installation portion 23c enable insertion of one or more screws, bolts, or any suitable fasteners, thereby fixing the filter cup 20c to the temperature controlling structure 10c. As shown, the installation portion 23c of the filter cup 20c may, but is not limited to, be a flange extending outwards from the cup portion 21c and fitting the surface of the holding structure 15c.

As shown, the bottom portion 13 of the filter cup 20c may be in a shape providing a flat and wide surface. In addition, to facilitate fluid flowing out of the filter cup 20c, the filter cup 20c may have a plurality of liquid outlets 212' arranged at the bottom thereof.

Further, optionally, the filter assembly 1b may further include a waterproof ring O', the waterproof ring O' may be made of rubber and can be arranged between the installation portion 23c of the filter cup 20c and the holding structure 15c of the temperature controlling structure 10c to achieve the watertightness of the joint between the temperature controlling structure 10c and the filter cup 20c.

Figure 12:
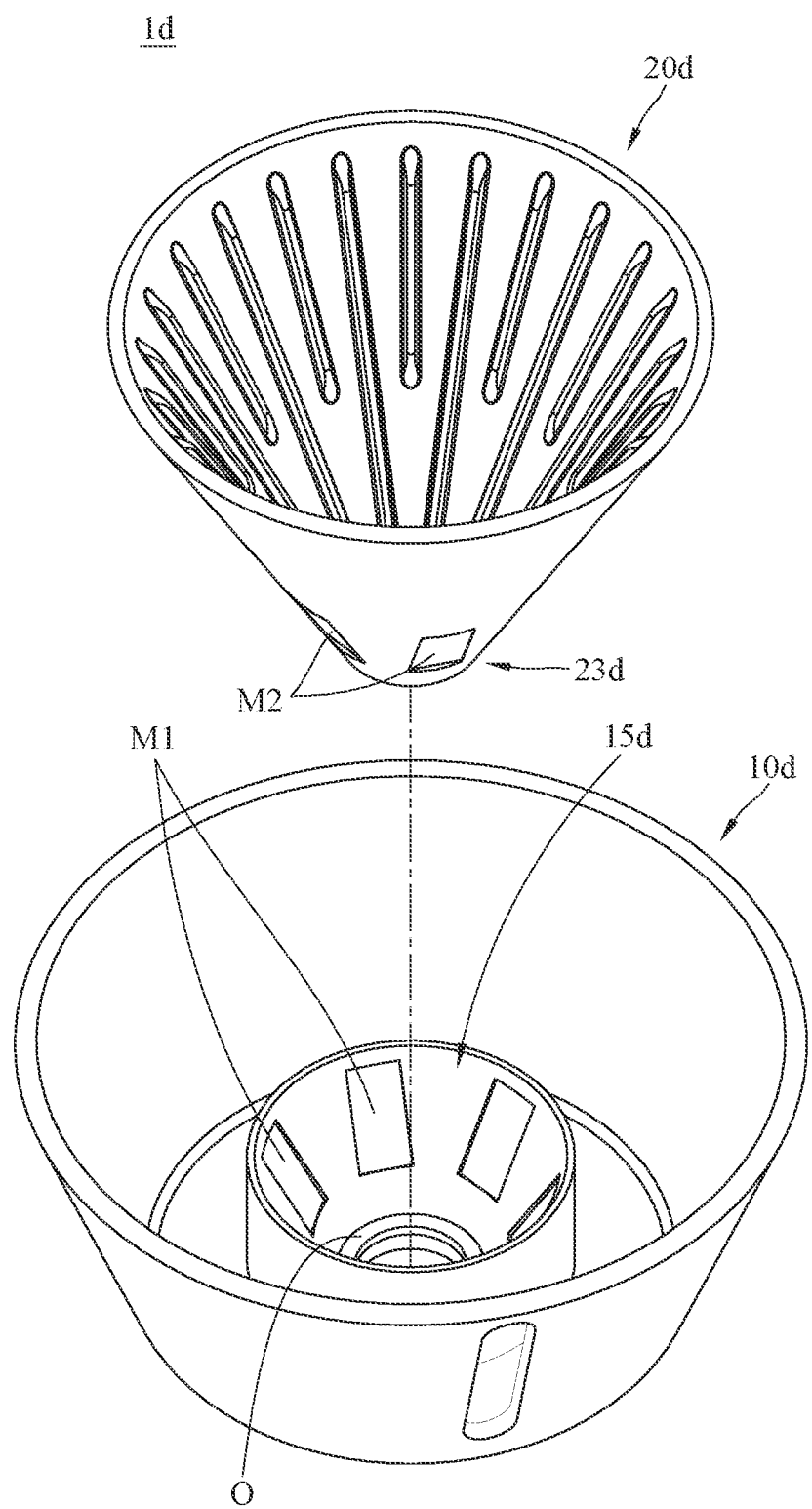
FIG. 12 is an exploded view of a filter assembly according to another embodiment of the disclosure.
Figure 13:
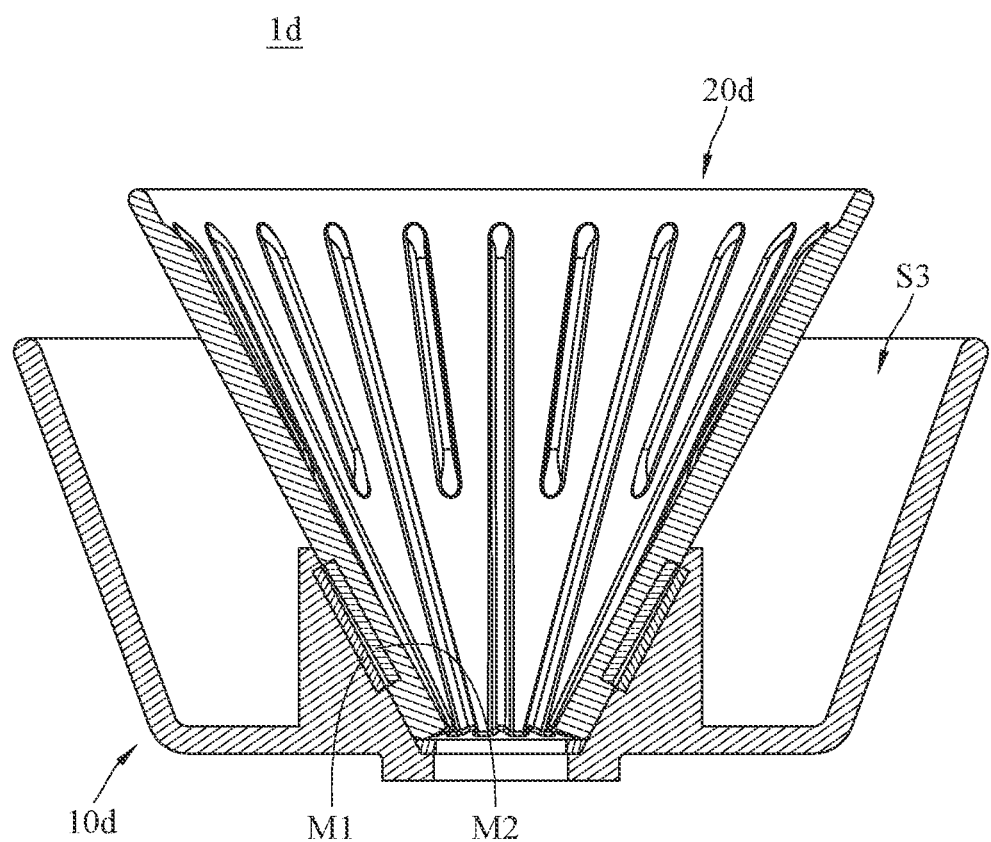
FIG. 13 is a cross-sectional view of the filter assembly in FIG. 12.

Please refer to FIGS. 12-13, another embodiment of the disclosure provides a filter assembly 1d, a temperature controlling structure 10d of the filter assembly 1d includes a holding structure 15d including one or more first magnetic components M1 embedded in the internal wall thereof. Correspondingly, a filter cup 20d includes an installation portion 23d including one or more second magnetic components M2 embedded in the external wall thereof. The first magnetic components M1 are respectively corresponding to and magnetically attracted to the second magnetic components M2. As such, the filter cup 20d can be magnetically attached to the temperature controlling structure 10d as the first magnetic components M1 and the second magnetic components M2 are closer enough to each other. Note that the first magnetic component M1 and the second magnetic component M2 in another embodiment (not shown in the drawings) may be in a ring shape; specifically, a first magnetic component M1 may surround the external wall of the installation portion 23d of the filter cup 20d, and a second magnetic component M2 may surround the internal wall of the holding structure 15d of the temperature controlling structure 10d.

Figure 14:
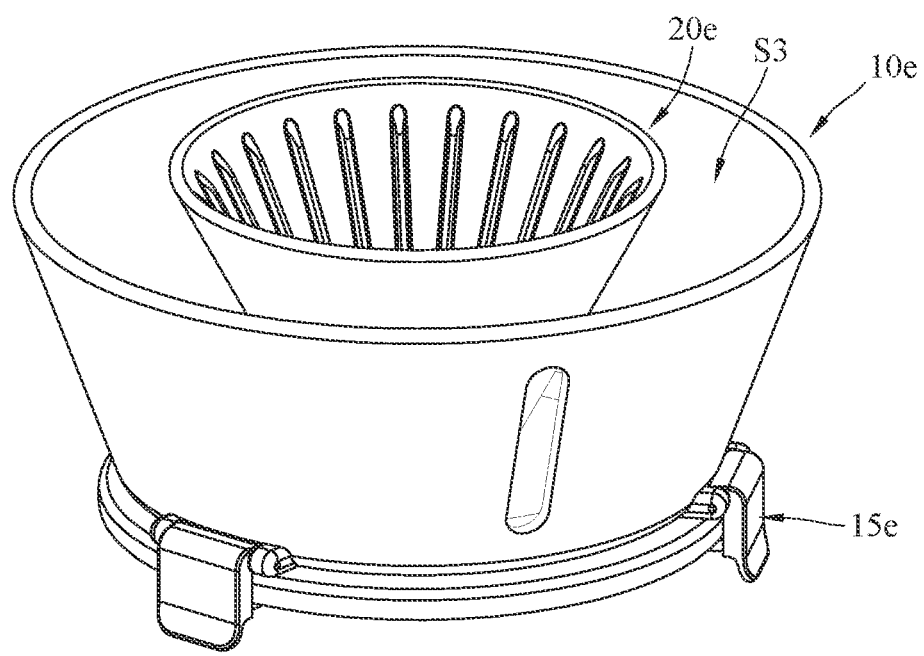
FIG. 14 is a perspective view of a filter assembly according to another embodiment of the disclosure.
Figure 15:
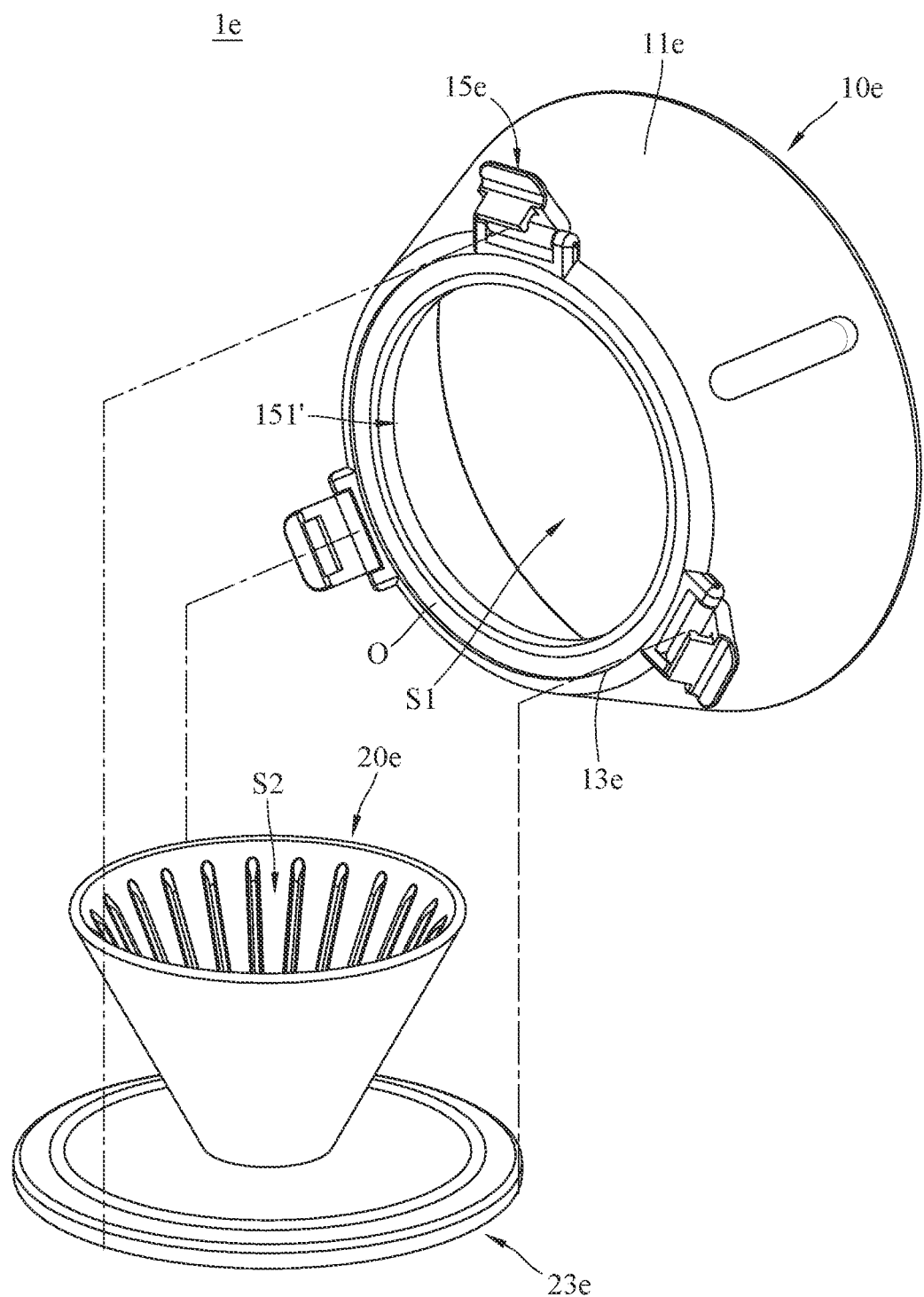
FIG. 15 is an exploded view of the filter assembly in FIG. 14.
Figure 16:
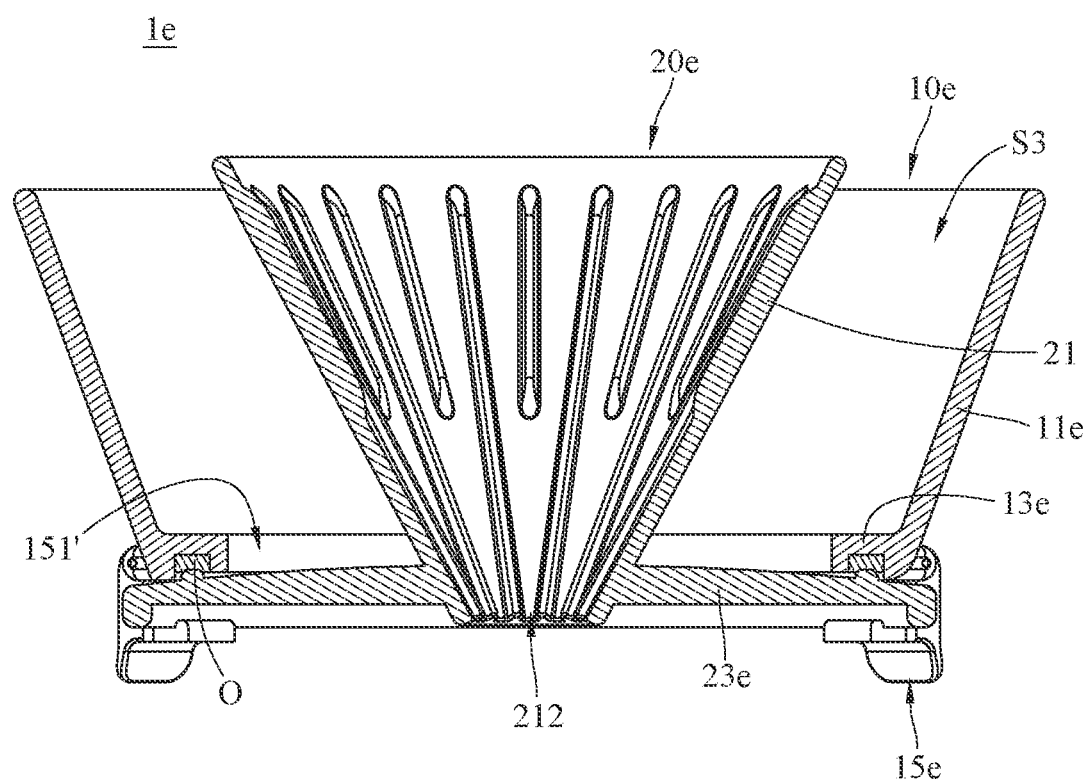
FIG. 16 is a cross-sectional view of the filter assembly in FIG. 14.

Please refer to FIGS. 14-16, another embodiment of the disclosure provides a filter assembly 1e, a temperature controlling structure 10e of the filter assembly 1e may include one or more holding structures 15e, the holding structures 15e may each be a latch or hook pivotally provided on an external wall of a bottom portion 13e or a surrounding portion 11e. In addition, a coupling hole 151' may be defined by a bottom portion 13e of the temperature controlling structure 10e. The bottom portion 13e may be a short extension from the end of the surrounding portion 11e so that the coupling hole 151' defined by the bottom portion 13e has a relatively large diameter. Correspondingly, an installation portion 23e of the filter cup 20e is a flange extending outward from the bottom portion of the cup portion 21, as shown, the installation portion 23e can support the bottom portion 13e of the temperature controlling structure 10e and also can seal the coupling hole 151'; in other words, the bottom portion 13e of the temperature controlling structure 10e can be placed or stacked on the installation portion 23e of the filter cup 20e. In such an arrangement, the coupling hole 151' exposes the installation portion 23e of the filter cup 20e to the accommodation space S1 of the temperature controlling structure 10e, and the temperature controlling structure 10e can be detachably fixed on the filter cup 20e by the holding structures 15e to engage with the installation portion 23e of the filter cup 20e.

It is noted the shape, thickness, or length of the bottom portion 13e and how the bottom portion 13e is assembled to the installation portion 23e of the filter cup 20e all may be modified as required. For example, in other embodiments, the bottom portion may extend outward in the same direction of the surrounding portion, and the installation portion may be a recess or groove mating the bottom portion.

It is also noted that the filter assembly 1e may also adopt a waterproof ring O, and the waterproof ring O may be arranged between the bottom portion 13e of the temperature controlling structure 10e and the installation portion 23e of the filter cup 20e to achieve the watertightness of the joint between the temperature controlling structure 10e and the filter cup 20e.

Figure 17:
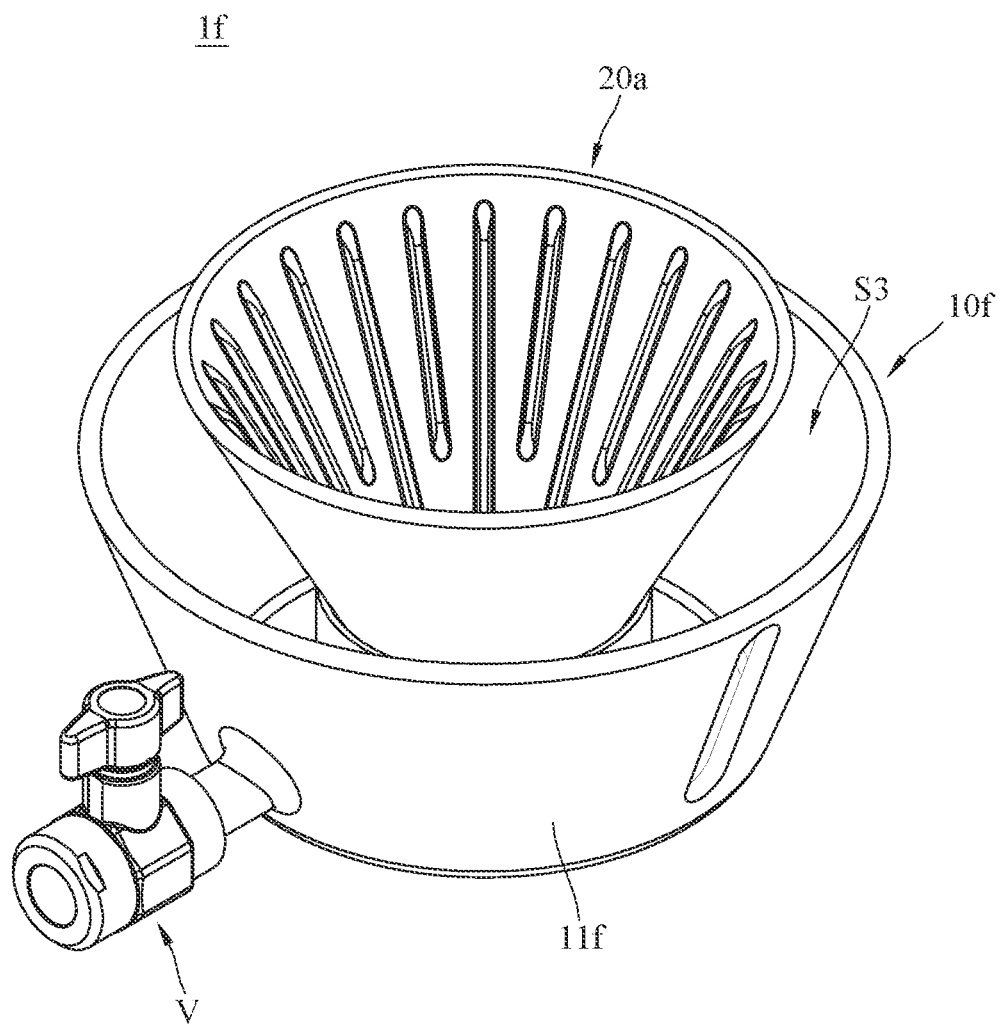
FIG. 17 is a perspective view of a filter assembly according to another embodiment of the disclosure.

Please refer to FIG. 17, another embodiment of the disclosure provides a filter assembly 1f, an outlet valve V may be disposed on a surrounding portion 11f of a temperature controlling structure 10f of the filter assembly 1f to selectively discharge the liquid out of the temperature controlling structure 10f, allowing the user to discharge and refill water at a required temperature during any selected phase of the brewing process.

In one application, during the pause phase after the first adding water phase, the outlet valve V permits the user to discharge the temperature-controlling water and then refill the liquid accommodation space S3 with water at lower temperature (e.g., about 60° C.). By doing so, the filter cup 20a will be at a lower temperature, thus temperature of the water poured for brewing ground coffee during the second adding water phase can be cooled down, thereby making the ground coffee under-extracted during the second adding water phase. As such, the middle to late phases that mainly produce the bitter taste is on purposely under-extracted, which helps make the salty, sour, and sweet tastes which are mainly produced during the early to middle phase become standing out.

Figure 18:
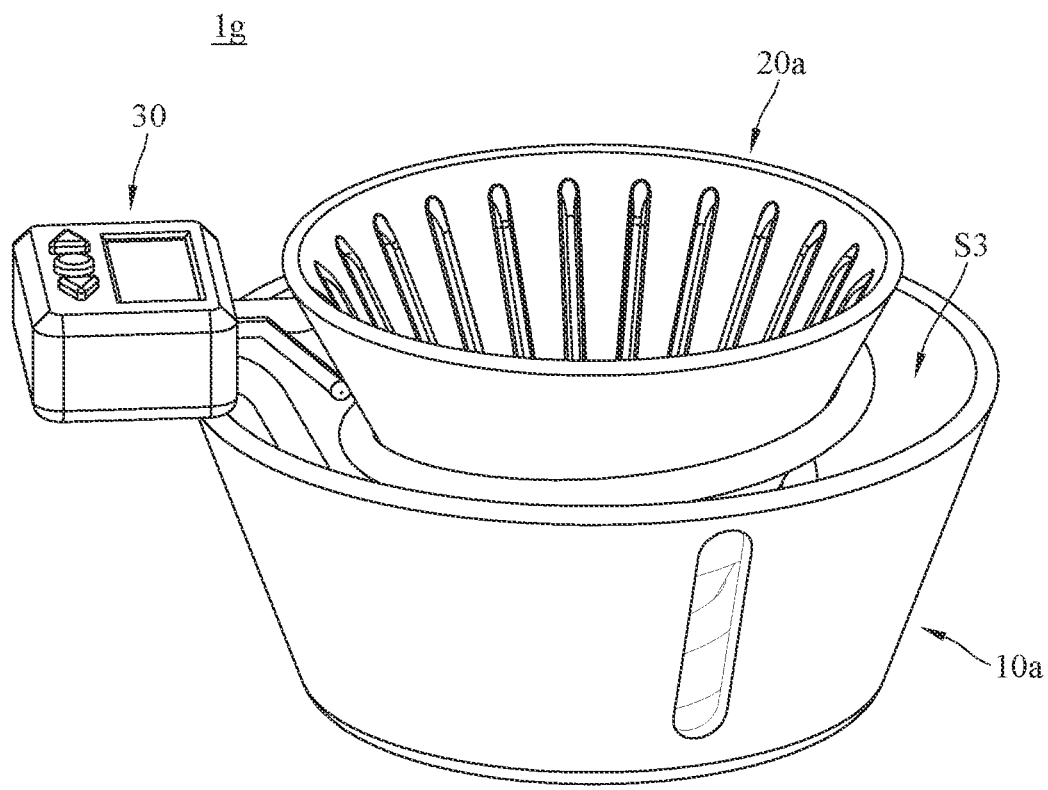
FIG. 18 is a perspective view of a filter assembly according to another embodiment of the disclosure.
Figure 19:
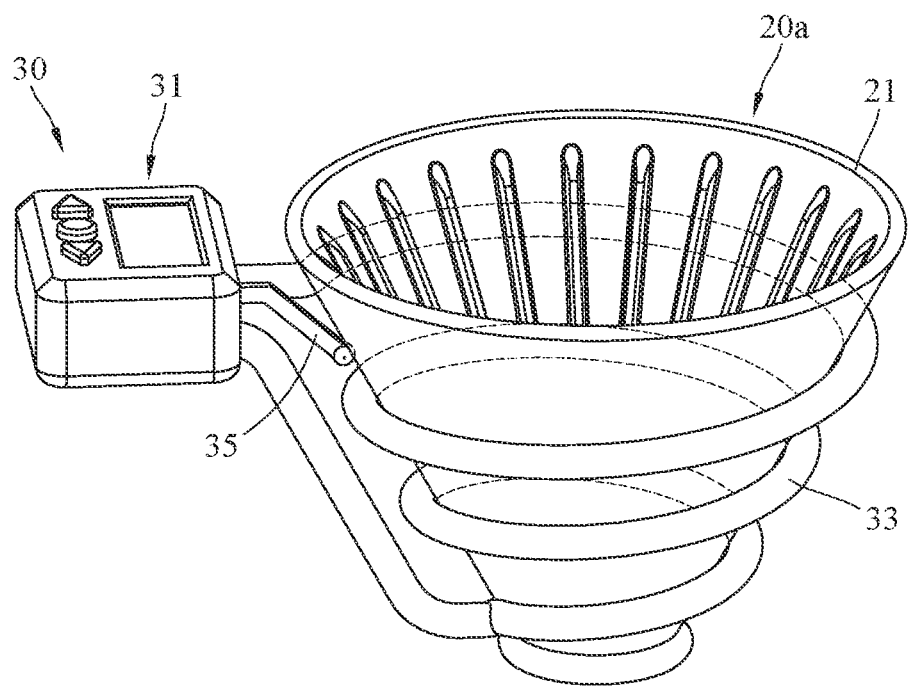
FIG. 19 is a perspective view showing the filter cup and the heater in FIG. 18.

Please refer to FIGS. 18-19, another embodiment of the disclosure provides a filter assembly 1g, the filter assembly 1g may further include a heater 30 detachably arranged on the filter cup 20a, the heater 30 is configured to thermally contact the filter cup 20a so as to heat the water in the temperature controlling structure 10a and the filter cup 20a. The heater 30 is not limited to be applied to the filter cup 20a but can be applied to the temperature controlling structures and filter cups as discussed in any one of the previous embodiments.

Specifically, in this embodiment, the heater 30 may include a controller 31, a heating structure 33, and a temperature sensor 35. The controller 31 may contain required electrical components, such as microprocessor, memory, and battery. In addition, the controller 31 may have interactive elements for user interaction, such as buttons and display (not numbered). The heating structure 33 is coupled to the controller 31. The heating structure 33 may be made of any suitable thermal conductive material. The heating structure 33 can be controlled by the controller 31. The heating structure 33 is able to produce thermal energy. As shown, the heating structure 33 may be in a shape surrounding and mating the contour of the cup portion 21 of the filter cup 20a, thus the heating structure 33 is able to heat the filter cup 20a while supporting or holding the filter cup 20a. The temperature sensor 35 is coupled to the controller 31. The temperature sensor 35 may be made of any suitable thermal conductive material and is configured to thermally contact the filter cup 20a while the heating structure 33 holding the filter cup 20a. The controller 31 can measure the temperature of the filter cup 20a via the temperature sensor 35.

In such an arrangement, the temperature of the filter cup 20a can be fixed or raised by the heater 30. Understandably, when both the filter cup 20a and the heater 30 are placed in the temperature controlling structure 10a, the temperature of the water in the temperature controlling structure 10a can also be fixed or raised by the heater 30. In one embodiment, the heater 30 may be in direct contact with the water in the temperature controlling structure 10a but not in direct contact with the filter cup 20a. In another embodiment, the temperature sensor 35 may be not in direct contact with the filter cup 20a but merely in direct contact with the water in the temperature controlling structure 10a.

Figure 20:
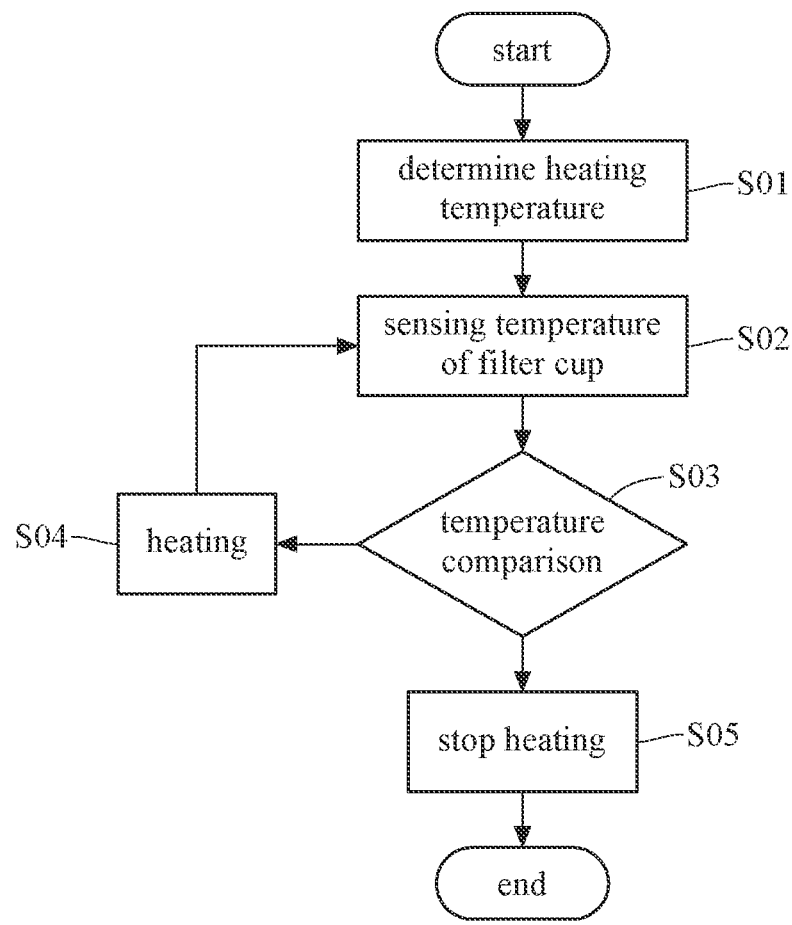
FIG. 20 is a flowchart showing the operation of the filter assembly in FIG. 18.

Herein, please refer to FIG. 20, a flowchart showing the operation of the filter assembly 1g is provided. Firstly, the controller 31 is turned on to activate the heater 30. Then, in step S01, the user can determine the required temperature of the filter cup 20a and the water in the temperature controlling structure 10a by operating the controller 31. Meanwhile or then, in step S02, the controller 31 is able to measure the temperature of the filter cup 20*a* and the water in the temperature controlling structure 10*a* using the temperature sensor 35. Meanwhile or then, in step S03, the controller 31 compares the required temperature with the temperatures obtained by the temperature sensor 35. When the required temperature is higher than the temperatures obtained by the temperature sensor 35, the temperature of the filter cup 20*a* and the water in the temperature controlling structure 10*a* are determined to be not yet reaching the requirement, then the step S04 is performed, the controller 31 will heat the filter cup 20*a* and the water in the temperature controlling structure 10*a* using the heating structure 33, then, the steps S02 and S03 are repeated to compare the required temperature with the temperatures of the filter cup 20*a* and the water in the temperature controlling structure 10*a* obtained by the temperature sensor 35. When the required temperature is lower or equal to the temperatures obtained by the temperature sensor 35, the temperature of the filter cup 20*a* and the water in the temperature controlling structure 10*a* are determined to reach the requirement. Then, in S05, the controller 31 stops the heating structure 33 from heating the filter cup 20*a* and the water in the temperature controlling structure 10*a*. In one embodiment, the steps S02 and S03 may be performed again after the step S05.

It is noted that the ratio of the height of the surrounding portion of the temperature controlling structure to the height of the cup portion of the filter cup may be modified as required as long as the water capacity of the temperature controlling structure is sufficient to have a required influence on the filter cup. In the previous or some other embodiments, the surrounding portion of the temperature controlling structure may be shorter than the cup portion of the filter cup to prevent the user from pouring the temperature-controlling water into the filter cup. In one embodiment, the height of the surrounding portion may be about ½-9/10 of the height of the cup portion. In another embodiment, the surrounding portion of the temperature controlling structure may be as high as the cup portion.

According to the temperature controlling structure and the filter assembly as discussed in the above embodiments of the disclosure, the temperature controlling structure provides a liquid accommodation space surrounding the filter cup, thus, before or during the brewing process, the user is allowed to pour water at a specific temperature into the temperature controlling structure to surround the filter cup, thereby affecting, controlling, or adjusting the temperature of the filter cup and the filter paper therein. Taking pour-over coffee as an example, the temperature controlling structure allows the user to selectively add water at a specific temperature into the liquid accommodation space during one or more wanted phases of brewing process (e.g., early phase, early-middle phase, middle phase, middle-late phase, or late phase), thus making it possible to minimize or adjust the temperature difference among the filter cup, filter paper, and the brewing water during the selected brewing phase. For example, by adding hot water into the liquid accommodation space during the early phase and early-middle phases, the temperatures of the filter cup and the filter paper can be raised so that the temperature difference among the filter cup, the filter paper, and the brewing water is reduced, which helps reduce the temperature reduction of the brewing water when the early to middle phase, thereby increasing the extraction rate of soluble solids during the selected phases. Alternatively, by adding water at lower temperature into the liquid accommodation space to decrease the temperature of the filter cup and the filter paper during the middle to late phase, the temperature difference among the filter cup, filter paper, and the brewing water can be increased, thereby decreasing the extraction rate of soluble solids during the selected phases.

As such, the temperature controlling structure and the filter assembly as discussed in the above embodiments of the disclosure provide a convenient and efficient solution for the user to adjust or control the temperature of the brewing water during the selected phase of the brewing process, which makes the user able to significantly reduce or eliminate the negative influence that the ambient temperature has on the brewing water. Accordingly, the temperature controlling structure can assist the user in making the required taste of beverage as well as assist the user in ensuring consistency in the taste.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A filter assembly comprising:
a temperature controlling structure, comprising:
a bottom portion;
a surrounding portion connected to the bottom portion, wherein the surrounding portion comprises an outwardly extending portion; and
a filter cup detachably disposed at the bottom portion;
wherein the surrounding portion, the bottom portion, and the filter cup define a liquid accommodation space surrounding the filter cup;
wherein an average distance between the outwardly extending portion and the filter cup is greater than an average distance between a remaining part of the surrounding portion and the filter cup.

2. The filter assembly according to claim 1, wherein the temperature controlling structure further comprises a holding structure arranged at the bottom portion, the filter cup comprises a cup portion and an installation portion provided on the cup portion, and the holding structure is detachably installed on the installation portion.

3. The filter assembly according to claim 2, wherein a contour of the holding structure fits a contour of the installation portion.

4. The filter assembly according to claim 3, wherein the holding structure is an internal thread, the installation portion is an external thread engageable with the internal thread.

5. The filter assembly according to claim 2, wherein the holding structure and the installation portion each are one or more threaded holes or through holes configured for insertion of one or more screws or bolts.

6. The filter assembly according to claim 2, wherein the holding structure comprises at least one first magnetic component, the installation portion comprises at least one second magnetic component, the at least one first magnetic component and the at least one second magnetic component are magnetically attractive to each other.

7. The filter assembly according to claim 2, wherein the installation portion extends outwards from the cup portion, the bottom portion is stacked on the installation portion, the holding structure is pivotally provided on an external wall of the bottom portion and is configured to be detachably engaged with the installation portion.

8. The filter assembly according to claim 1, further comprising a heater arranged on the filter cup.

9. The filter assembly according to claim 1, wherein the surrounding portion of the temperature controlling structure has a liquid inlet and a coupling hole respectively located at two opposite sides of the liquid accommodation space, and the coupling hole is configured to surround a liquid outlet of the filter cup.

10. The filter assembly according to claim 1, wherein the temperature controlling structure further comprises at least one support rib radially extending inward from an inner wall of the surrounding portion and configured to support the filter cup.

11. The filter assembly according to claim 10, wherein the at least one support rib has at least one hole.

12. The filter assembly according to claim 1, wherein the surrounding portion of the temperature controlling structure comprises at least one light-permeable portion.

13. A temperature controlling structure, comprising:
a bottom portion;
a surrounding portion comprises an outwardly extending portion; and
a holding structure;
wherein the bottom portion is connected to the surrounding portion and the holding structure;
wherein an average distance between the outwardly extending portion and a filter cup configured to be detachably disposed at the bottom portion is greater than an average distance between a remaining part of the surrounding portion and the filter cup.

14. The temperature controlling structure according to claim 13, wherein the holding structure is configured to be detachably fixed to an installation portion of a cup portion of the filter cup.

15. The temperature controlling structure according to claim 14, wherein a contour of the holding structure fits a contour of the installation portion of the filter cup.

16. The temperature controlling structure according to claim 14, wherein the holding structure is an internal thread.

17. The temperature controlling structure according to claim 14, wherein the holding structure comprises one or more threaded holes or through holes configured for insertion of one or more screws or bolts.

18. The temperature controlling structure according to claim 14, wherein the holding structure comprises at least one first magnetic component.

19. The temperature controlling structure according to claim 14, wherein the installation portion extends outwards from the cup portion, the bottom portion is configured to be stacked on the installation portion of the filter cup, the holding structure is pivotally provided on an external wall of the bottom portion and is configured to be detachably engaged with the installation portion.

20. The temperature controlling structure according to claim 13, wherein the surrounding portion has a liquid inlet and a coupling hole respectively located at two opposite sides of an accommodation space defined by the surrounding portion and the bottom portion, and the coupling hole is configured to surround a liquid outlet of the filter cup.

21. The temperature controlling structure according to claim 13, further comprising at least one support rib radially extending inward from an internal wall of the surrounding portion and configured for supporting the filter cup.

22. The temperature controlling structure according to claim 21, wherein the at least one support rib has at least one hole.

23. The temperature controlling structure according to claim 13, wherein the surrounding portion comprises at least one light-permeable portion.

* * * * *